United States Patent
Wurzer et al.

(10) Patent No.: US 11,292,533 B1
(45) Date of Patent: Apr. 5, 2022

(54) DECK PLATE ASSEMBLY FOR A TRUCK CHASSIS

(71) Applicants: Adam J. Wurzer, Carroll, IA (US); Terry D. Wurzer, Coon Rapids, IA (US); David T. Wurzer, Carroll, IA (US)

(72) Inventors: Adam J. Wurzer, Carroll, IA (US); Terry D. Wurzer, Coon Rapids, IA (US); David T. Wurzer, Carroll, IA (US)

( * ) Notice: Subject to any disclaimer, the term of this patent is extended or adjusted under 35 U.S.C. 154(b) by 58 days.

(21) Appl. No.: 17/065,672

(22) Filed: Oct. 8, 2020

(51) Int. Cl.
| | |
|---|---|
| *B62D 33/02* | (2006.01) |
| *B60D 1/01* | (2006.01) |
| *B62D 21/02* | (2006.01) |
| *B62D 25/20* | (2006.01) |
| *B62D 21/09* | (2006.01) |
| *B62D 49/00* | (2006.01) |

(52) U.S. Cl.
CPC ......... *B62D 33/0215* (2013.01); *B60D 1/015* (2013.01); *B62D 21/02* (2013.01); *B62D 21/09* (2013.01); *B62D 25/2027* (2013.01); *B62D 25/2054* (2013.01); *B62D 49/005* (2013.01)

(58) Field of Classification Search
CPC .... B62D 33/0215; B62D 21/02; B62D 21/09; B62D 25/2027; B62D 25/2054; B62D 49/005; B60D 1/015
USPC ...................................................... 296/184.1
See application file for complete search history.

(56) References Cited

U.S. PATENT DOCUMENTS

| | | | | |
|---|---|---|---|---|
| 5,449,191 A * | 9/1995 | Cattau | ............... | B62D 53/0807 280/407 |
| 6,692,013 B1 * | 2/2004 | Zebolsky | ............... | B62D 53/08 280/439 |
| 7,506,886 B2 * | 3/2009 | Warnock | ............ | B62D 53/0814 280/407 |
| 7,516,974 B1 * | 4/2009 | Mann | ..................... | B62D 53/08 280/407 |
| 7,699,334 B1 * | 4/2010 | Mann | ................... | B62D 53/062 280/407.1 |
| 8,333,399 B2 * | 12/2012 | Brown | ............... | B62D 53/0814 280/438.1 |
| 8,414,009 B2 * | 4/2013 | Stanifer | .................. | B60D 1/02 280/433 |
| 9,346,491 B1 | 5/2016 | Wurzer et al. | | |
| 10,053,150 B1 | 8/2018 | Wurzer et al. | | |

* cited by examiner

*Primary Examiner* — Pinel E Romain
(74) *Attorney, Agent, or Firm* — Dennis L. Thomte; Thomte Patent Law Office LLC

(57) ABSTRACT

A deck plate assembly for a truck chassis having first and second elongated frame members. Elongated rail brackets are mounted on the upper ends of the first and second frame members. Each of the rail brackets has an elongated slide slot formed in the inner sides thereof. A storage box and an airline box are positioned between the first and second frame members. A storage box support frame is slidably mounted in the slide slots of the rail brackets so as to be positioned over the storage box. The storage box is bolted to the storage box support frame. An airline box support is slidably mounted in the slide slots of the rail brackets so as to be positioned over the airline box. The airline box is bolted to the airline box support. Metal deck sections may also be slidably mounted in the rail brackets.

12 Claims, 10 Drawing Sheets

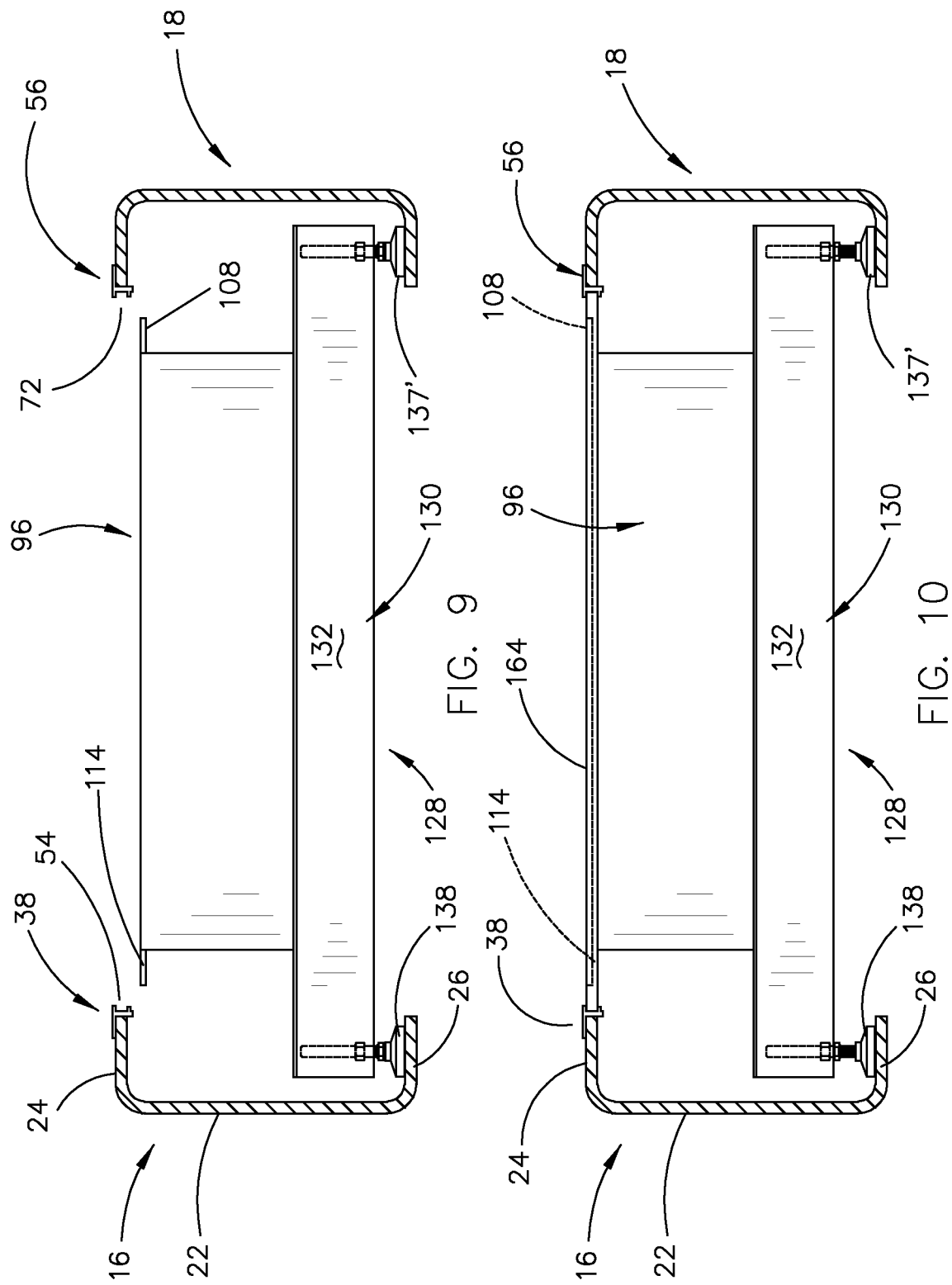

DECK PLATE ASSEMBLY FOR A TRUCK CHASSIS

BACKGROUND OF THE INVENTION

Field of the Invention

This invention relates to a deck plate assembly for attachment to the first and second longitudinally extending frame members of a truck chassis which is positioned thereon between the rearward end of the truck cab and fifth wheel of the truck. Even more particularly, this invention relates to a deck plate assembly which includes an airline box and a storage box. Even more particularly, this invention relates to a method of attaching the airline box and the storage box of the deck plate assembly to the first and second frame members.

Description of the Related Art

Semi-trailer trucks or tractors have long been used to pull trailers by way of a fifth wheel hitch structure. The truck or tractor usually has a frame or chassis which has steering wheels at the forward end thereof, drive wheels at the rearward end thereof, an engine, a cab, and a fifth wheel hitch structure at the rearward end of first and second longitudinally extending frame members which are exposed between the rearward end of the cab and the fifth wheel hitch. When a trailer is hitched to the fifth wheel structure of the truck, the front of the trailer is positioned rearwardly of the rearward end of the cab.

As the truck pulls the trailer over the road, debris such as gravel, mud, dirt, road de-icer, etc. is thrown upwardly between the first and second frame members onto the underside of the trailer and also onto the rearward side of the cab. If the truck is not pulling a trailer, the debris is thrown upwardly through the first and second frame members into the air and also onto the rearward side of the cab.

Attempts have been made to install deck plates on the upper ends of the first and second frame members of the truck in an easier fashion. One such attempt involves the attachment of elongated rail brackets to the upper ends of the first and second frame members wherein the inner sides of the rail brackets have an elongated, horizontally disposed and longitudinally extending slide slot formed therein. Each of the slide slots have rearward and forward ends. In that structure, the deck plate or deck plate sections are slidably extended forwardly in the slide slots. However, it is not possible to slidably extend those deck plate portions, which have downwardly extending portions, such as in airline boxes or storage boxes since the cross-members which extend between the first and second frame members of the truck chassis are in the slidable path of the boxes.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A deck plate assembly is provided for a truck having longitudinally extending and horizontally disposed first and second frame members with each of the frame members having a forward end, a rearward end, a lower end and an upper end. An elongated first rail bracket, having a forward end, a rearward end, an inner side, an outer side, an upper side and a lower side, is mounted on the upper end of the first frame member. The inner side of the first rail bracket has an elongated and horizontally disposed first slide slot formed therein which extends thereinto. An elongated second rail bracket, having a forward end, a rearward end, an inner side, an outer side and a lower side, is mounted on the upper end of the second frame member. The inner side of the second rail bracket has an elongated and horizontally disposed second slide slot formed therein which extends thereinto.

The deck plate assembly also includes a horizontally disposed first box support frame, having a first side frame member, a second side frame member, a forward end frame member and a rearward end frame member. The outer sides of the first and second side frame members of the first box support frame are slidably received in the rearward ends of the first and second slide slots in the first and second rail brackets respectively whereby the first box support frame may be slidably moved forwardly to the desired location in the first and second slide slots without any interference from cross-frame members. The upper end of a storage box is secured to the first box support frame at the desired location.

The assembly also includes a horizontally disposed second box support frame having a first side frame member, a second side frame member, a forward end frame member and a rearward end frame member. The outer sides of the first and second side frame members of the second box support frame are slidably received in the rearward ends of the first and second slide slots in the first and second rail brackets respectively whereby the second box support frame may be slidably moved forwardly to the desired location in the first and second slide slots without any interference from cross-frame members. The upper end of an airline box is secured to the second box support frame at the desired location.

In one embodiment, the storage box and the airline box are initially positioned below the first and second frame members of the truck chassis and are raised upwardly from beneath said first and second frame member for connection to said first and second support frames respectively.

In another embodiment, the storage box at the airline box are initially positioned above the first and second frame members of the truck chassis and are lowered from above said first and second frame members of the truck chassis to a position between said first and second frame members for connection to said first and second support frames respectively.

In another embodiment, leveling legs are secured to the storage box.

In another embodiment, leveling legs are secured to the airline box.

It is therefore a principal object of the invention to provide an improved deck plate assembly for a truck.

A further object of the invention is to provide a method and means for securing an airline box and a storage box to the frame members of a truck chassis without any interference from the cross-members of the truck frame.

A further object of the invention is to provide an improved deck plate assembly which is easy to install and durable in use.

A further object of the invention is to provide an improved deck plate assembly for a truck wherein the storage box thereof has leveling legs associated therewith to support the load in the storage box.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 9 is a partial end view of the storage box of this invention positioned between the frame members of the truck with the frame members being in section view;

FIG. 10 is a view similar to FIG. 9 except that the storage box has been raised by the leveling feet of the invention.

DESCRIPTION OF THE PREFERRED EMBODIMENT

Figure 1:
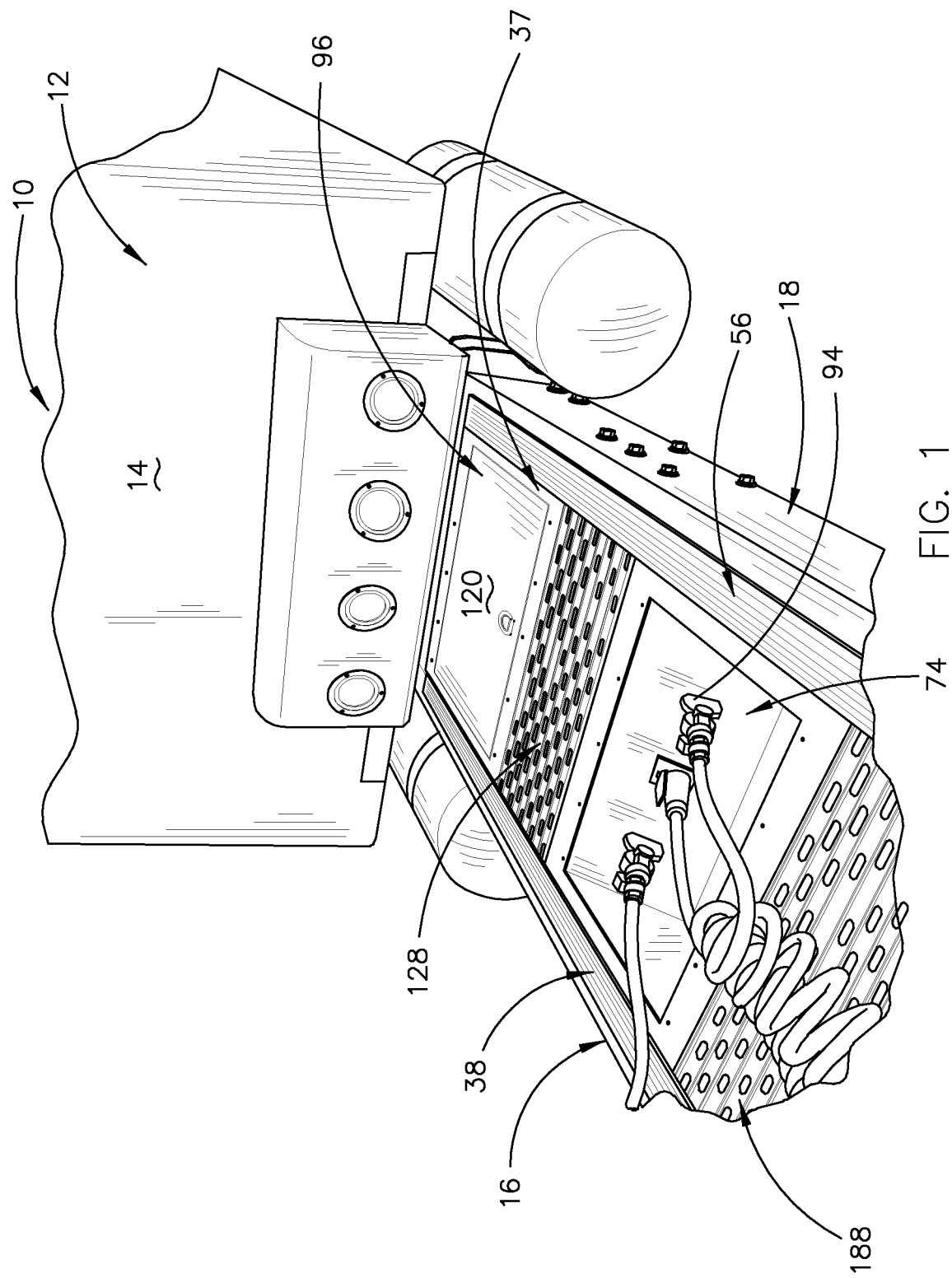
FIG. 1 is a partial rear perspective view of a truck and truck chassis having the deck plate assembly of this invention secured to a truck chassis.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional semi-truck or tractor which includes a cab 12 having a rearward side 14. Truck 10 includes first and second longitudinally extending frame members 16 and 18 which extend rearwardly from the forward end of the truck to a fifth wheel hitch structure (not shown). Frame members 16 and 18 are conventional in design. Frame member 16 includes a vertically disposed web portion 22, an upper flange 24 and a lower flange 26. Frame member 18 includes a vertically disposed web portion 28, an upper flange 30, and a lower flange 32. One or more horizontally disposed cross-members 34 are secured to the frame members 16 and 18 and extend therebetween in conventional fashion and are spaced-apart. Normally, a cross-member 34 extends between frame members 16 and 18 just forwardly of the fifth wheel structure of the truck 10. It is the area between the frame members 16 and 18 from the rear of the cab 12 to the fifth wheel structure that the debris will pass upwardly therethrough unless a deck plate is provided. The numeral 37 refers to the deck plate assembly of this invention.

Figure 5:
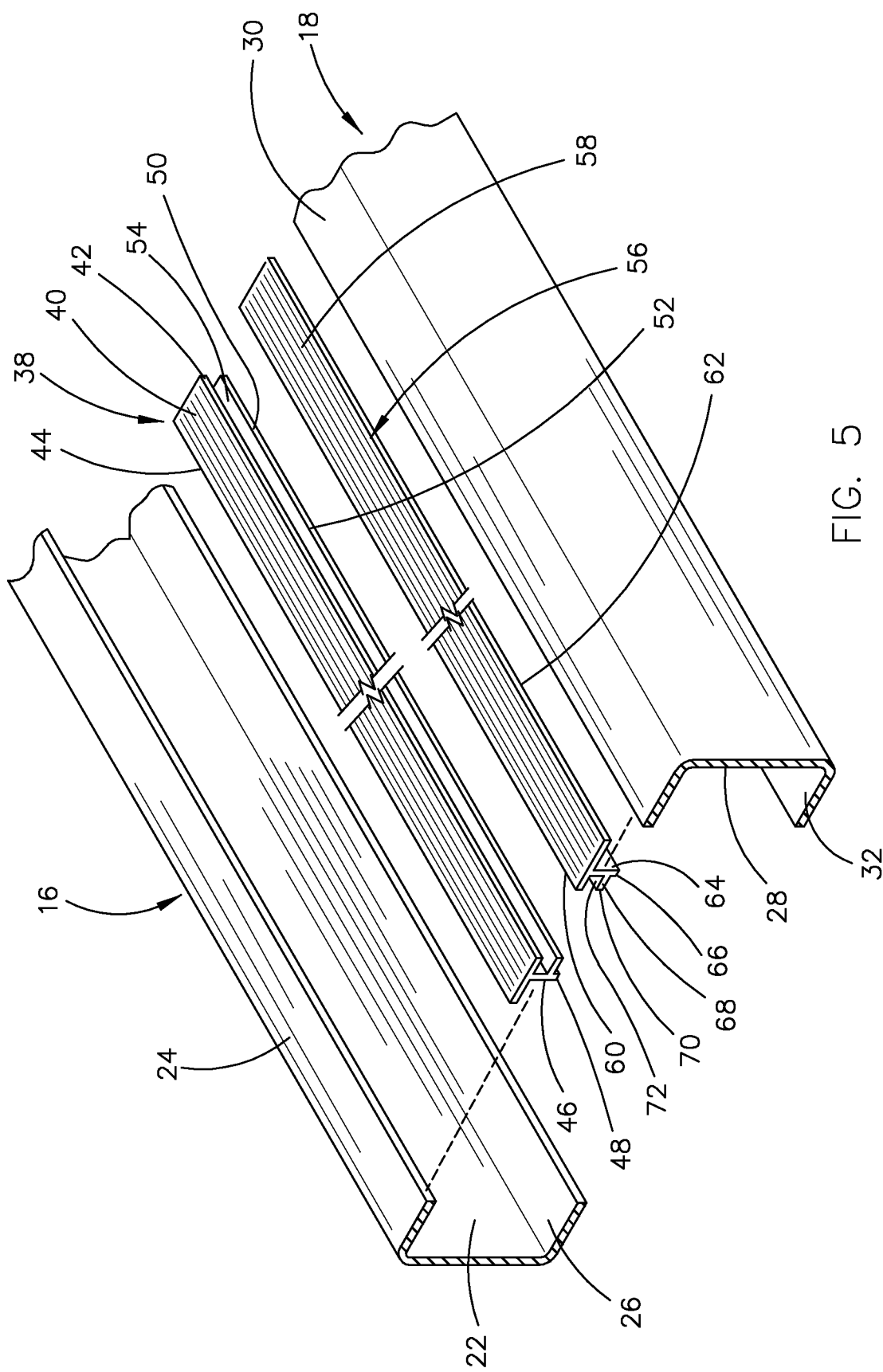
FIG. 5 is a partial exploded perspective view illustrating the relationship of the rail brackets and the truck chassis.
Figure 6:
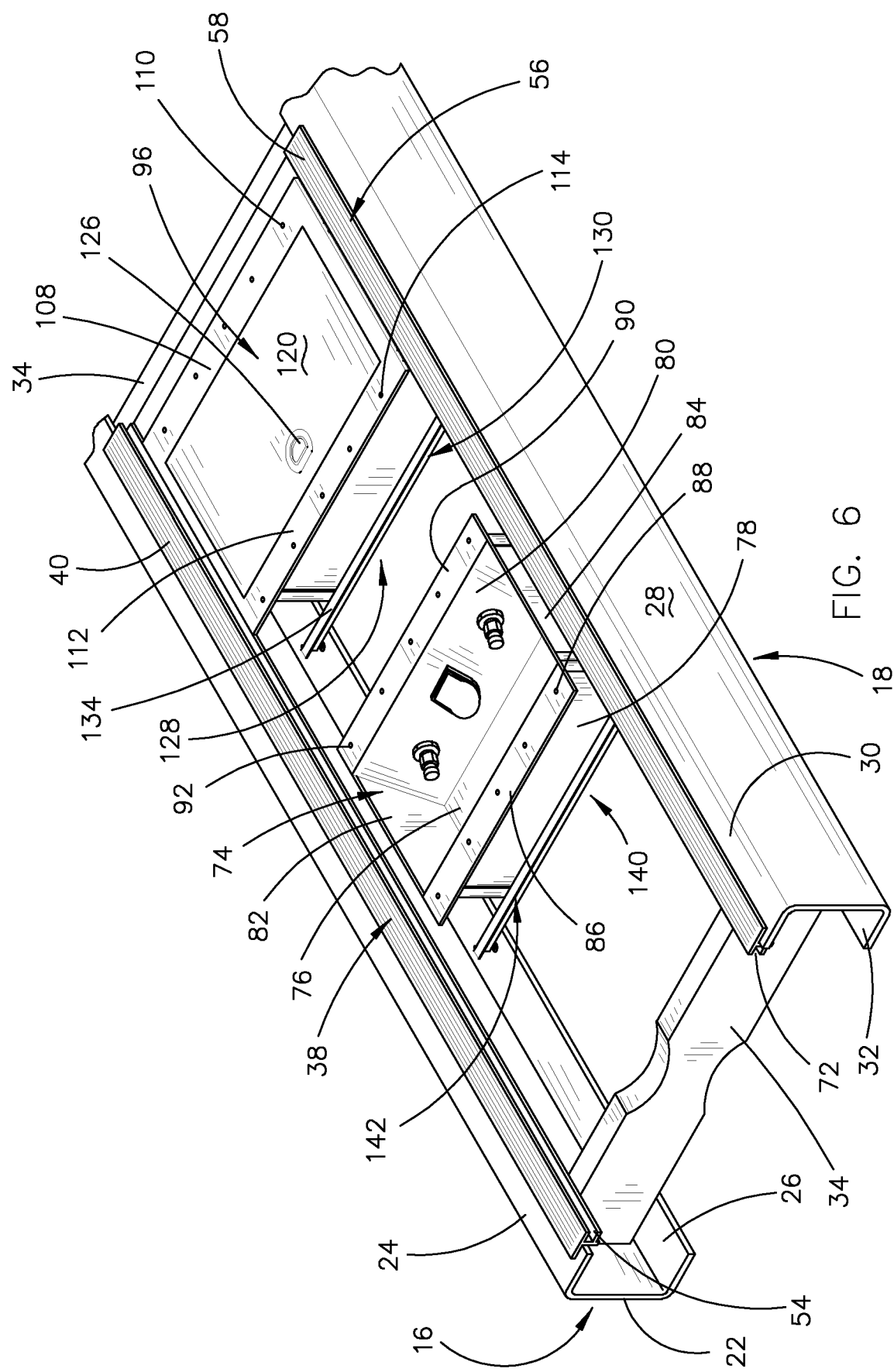
FIG. 6 is a partial perspective view similar to FIG. 4 except that the storage box and airline box have been raised somewhat before the box support frames have been secured thereto.
Figure 7:
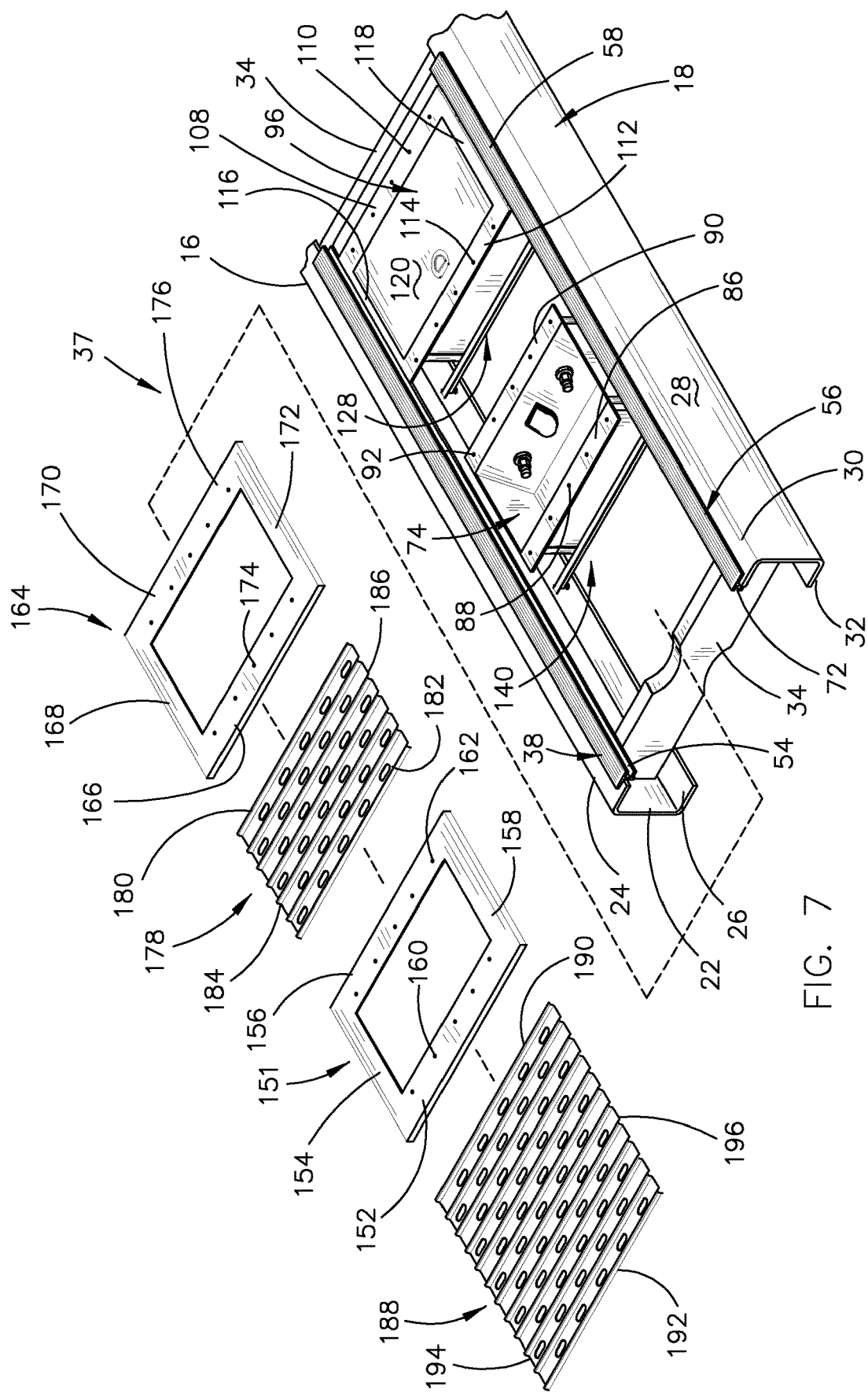
FIG. 7 is a partial exploded perspective view of the deck plate assembly of this invention.
Figure 8:
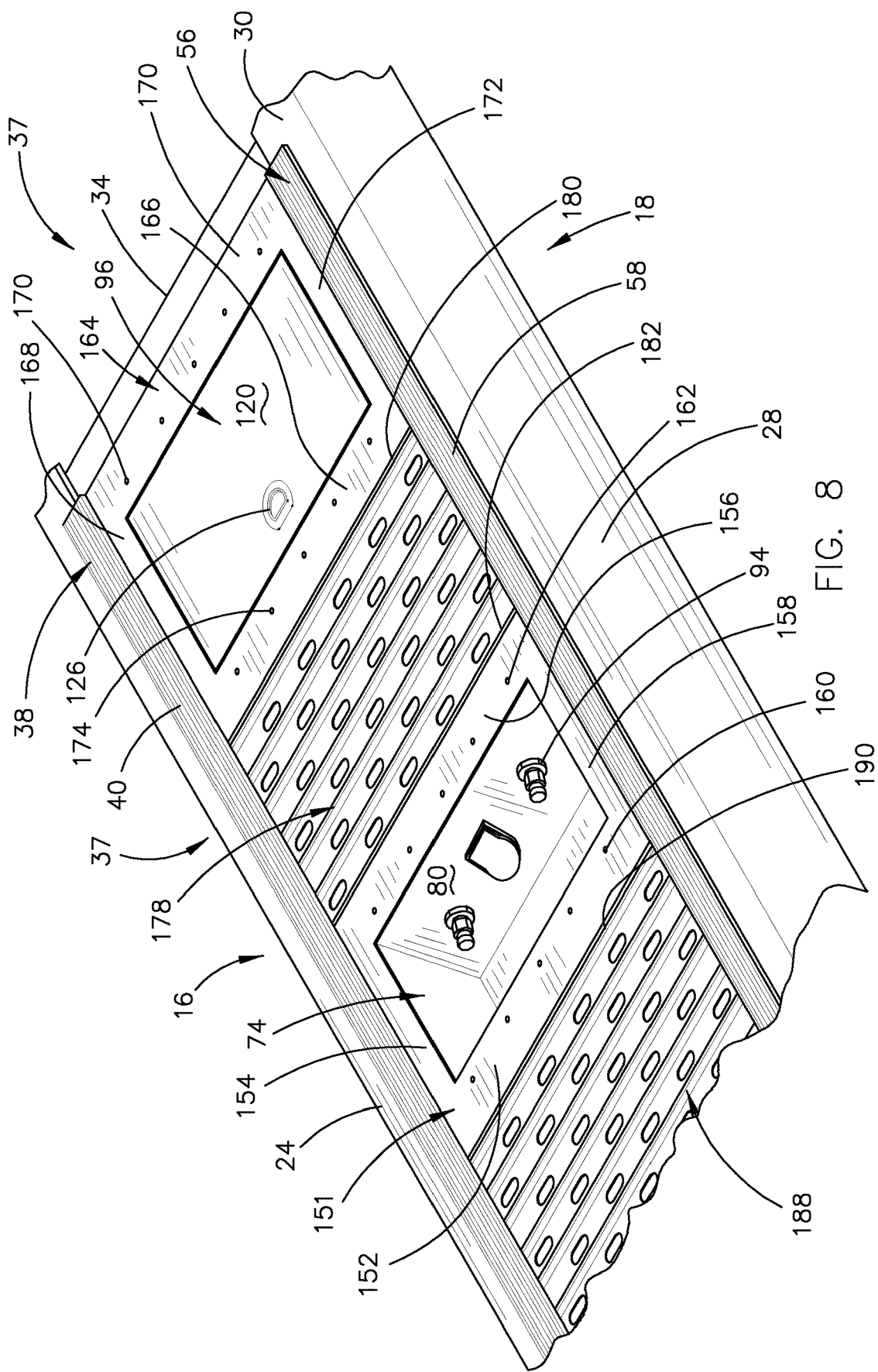
FIG. 8 is a partial perspective view of the deck plate assembly of this invention mounted on the truck frame.

The numeral 38 refers to an elongated rail bracket which is positioned on the upper flange 24 of frame member 16. Rail bracket 38 includes a horizontally upper plate 40 having an inner end 42 and an outer end 44. A vertically disposed wall 46 extends downwardly from upper plate 40 between ends 42 and 44 thereof. Wall 46 has a lower end 48 as seen in FIG. 5. A horizontally disposed lower wall 50 extends inwardly from wall 46 at the lower end 48 of wall 46 and has an inner end 52. The plate 38, wall 36 and wall 50 form an elongated and horizontally disposed slide slot 54. As seen in FIG. 6, the outer portion of plate 40 rests upon the upper flange 24.

The numeral 56 refers to an elongated rail bracket which is positioned on the upper flange 30 of frame member 18. Rail bracket 56 includes a horizontally disposed upper plate 58 having an inner end 60 and an outer end 62. A vertically disposed wall 64 extends downwardly from upper plate 58 between ends 60 and 62 thereof. Wall 64 has a lower end 66 as seen in FIG. 5. A horizontally disposed lower wall 68 extends inwardly from wall 64 at the lower end 66 of wall 64 and has an inner end 70. The plate 58, wall 64 and wall 68 form an elongated and horizontally disposed slide slot 72. As seen, the outer portion of plate 58 rests upon the upper flange 30 of frame member 18. Rail brackets 38 and 56 are secured to frame members 16 and 18 respectively by any convenient means.

The numeral 74 refers to the recessed airline box of this invention which is a component of the deck plate assembly 37. Box 74 includes a horizontally disposed bottom wall 76, an upstanding rear wall 78 which extends upwardly from the rear end of bottom wall 76, an inclined front wall 80 which extends upwardly and forwardly from the front end of bottom wall 76, a first end wall 82 and a second end wall 84. A mounting flange 86 extends horizontally rearwardly from the upper end of rear wall 78 and has a plurality of spaced-apart bolt openings 88 formed therein. A mounting flange 90 extends forwardly from the upper end of front wall 80 and has a plurality of spaced-apart bolt openings 92 formed therein. Front wall 80 has a plurality of openings 94 formed therein. Airline box 74 may have an optimal leveling leg assembly secured thereto as will be described hereinafter.

The numeral 96 refers to a storage box which is a component of the deck plate assembly 37. Storage box 96 includes a bottom wall 98, a front wall 100, a back wall 102, a first end or side wall 104, and a second end or side wall 106. The upper end of front wall 100 has a mounting flange 108 which extends horizontally forwardly therefrom. Mounting flange 108 has a plurality of spaced-apart bolt openings 110 formed therein. The upper end of back wall 102 has a mounting flange 112 which extends horizontally rearwardly therefrom. Mounting flange 112 has a plurality of spaced-apart bolt openings 114 formed therein. The upper end of the first side wall 104 of storage box 96 has a horizontally disposed flange 116 which extends horizontally outwardly therefrom. The upper end of the second side wall 106 of storage box 96 has a horizontally disposed flange 118 which extends horizontally outwardly therefrom. Neither flanges 116 and 118 have bolt openings formed therein.

Storage box 96 has an open upper end which is selectively closed by a lid or cover 120 which is hingedly secured to side walls 104 and 106 by spring-loaded hinges 122 and 124 respectively. The storage box 96 includes a thumb or finger latch 126 which is accessible from the outer side of lid 120.

Figure 2:
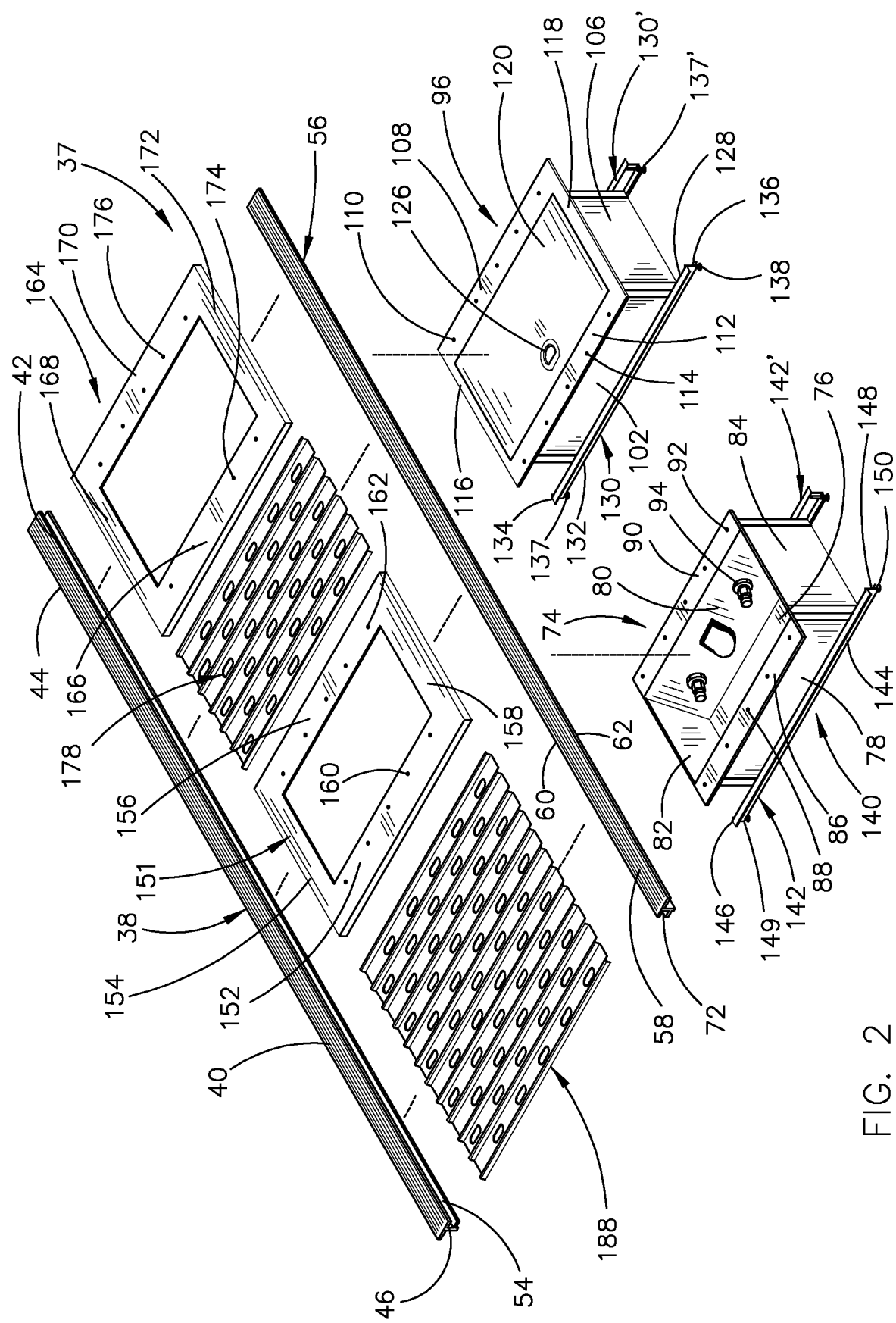
FIG. 2 is an exploded perspective view of the deck plate assembly of this invention.
Figure 11:
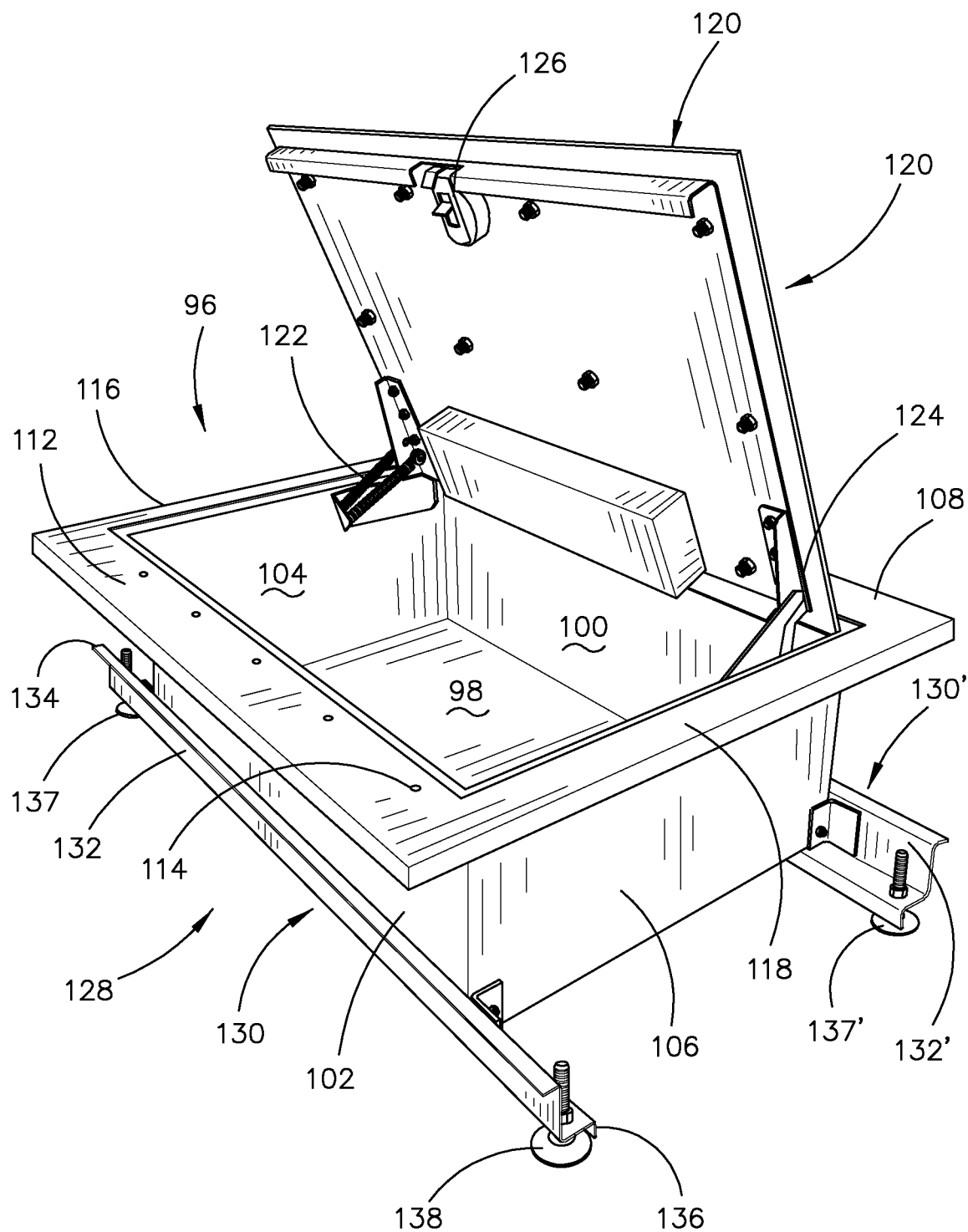
FIG. 11 is a perspective view of the storage box of this invention with the cover or lid thereof being open.

Latch 126 may be key operated if so desired to safeguard the contents of the storage box 96. Storage box 96 also includes a leveling leg assembly 128 which is optional but which is highly recommended. Assembly 128 includes a rear leveling leg structure 130 and a front leveling leg structure 130' which is identical to the rear leveling structure 130 and which will be indicated with "'". Rear leveling leg structure 130 includes a horizontally disposed and elongated support member 132 having ends 134 and 136. Vertically adjustable leveling legs 137 and 138 are adjustably mounted on the ends 134 and 136 of support member 132 respectively. Support member 132 is secured to the lower rear of storage box 96 as seen in FIG. 2 and FIG. 11. Leveling leg structure 130' is mounted to the lower forward end of storage box 96 in the same manner as support member 132 is secured to storage box 96 and has a pair of leveling legs 137' and 138' (not shown) secured thereto. The leveling leg structures 130 and 130' are designed to support the storage box 96 on the flanges 26 and 32 of frame members 16 and 18 respectively as will be discussed hereinafter.

The drawings illustrate that the airline box 74 has a leveling leg assembly 140 mounted thereon which is identical to leveling leg assembly 128. Leveling leg assembly 140 is optional but suggested. Leveling leg assembly 140 includes a rear leveling leg structure 142 and a front leveling leg structure 142' which is identical to leveling leg structure 142 and which will be indicated with "'". Rear leveling leg structure 142 includes a horizontally disposed and elongated support member 144 having ends 146 and 148. Vertically adjustable leveling legs 149 and 150 are mounted on the ends 146 and 148 of support member 144 respectively. Support member 144 is secured to the lower rear of box 74 as seen in FIG. 2. Leveling leg structure 142' is mounted to the lower forward end of airline box 74 in the same manner as leveling leg structure 142 is secured to box 74.

The numeral 151 refers to a horizontally disposed support frame for the airline box 74 which includes a rear frame member 152, a first side frame member 154, a front frame member 156 and a second side frame member 158. Frame member 152 includes a plurality of spaced-apart bolt openings 160 formed therein. Frame member 156 has a plurality of spaced-apart bolt openings 162 formed therein. Bolt members may be press-fitted into openings 160 and 162 so as to extend downwardly from the underside of frame members 152 and 156 for insertion into the bolt openings 88 and 92 in mounting flanges 86 and 90 of airline box 74. If bolt members are not press-fitted into the bolt openings 88 and 92, carriage bolts will replace those press-fitted bolts.

The numeral 164 refers to a horizontally disposed support frame for the storage box 96 which includes a rear frame member 166, a first side frame member 168, a front frame member 170 and a second side frame member 172. Frame member 166 has a plurality of spaced-apart bolt openings 174 formed therein. Frame member 170 has a plurality of spaced-apart bolt openings 176 formed therein. Bolt members may be press-fitted into openings 174 and 176 so as to extend downwardly from the underside of frame members 166 and 170 for insertion at the bolt openings 110 and 114 in mounting flanges 108 and 112. If bolt members are not press-fitted into the bolt openings 174 and 176, carriage bolts will replace those press-fitted bolts.

The numeral 178 refers to a metal sectional deck portion having a forward end 180, a rearward end 182, a first side edge 184 and a second side edge 186. The numeral 188 refers to another metal sectional deck portion having a forward end 190, a rearward end 192, a first side edge 194 and a second side edge 196. As seen, the sectional deck portions are corrugated and have openings formed therein.

Figure 3:
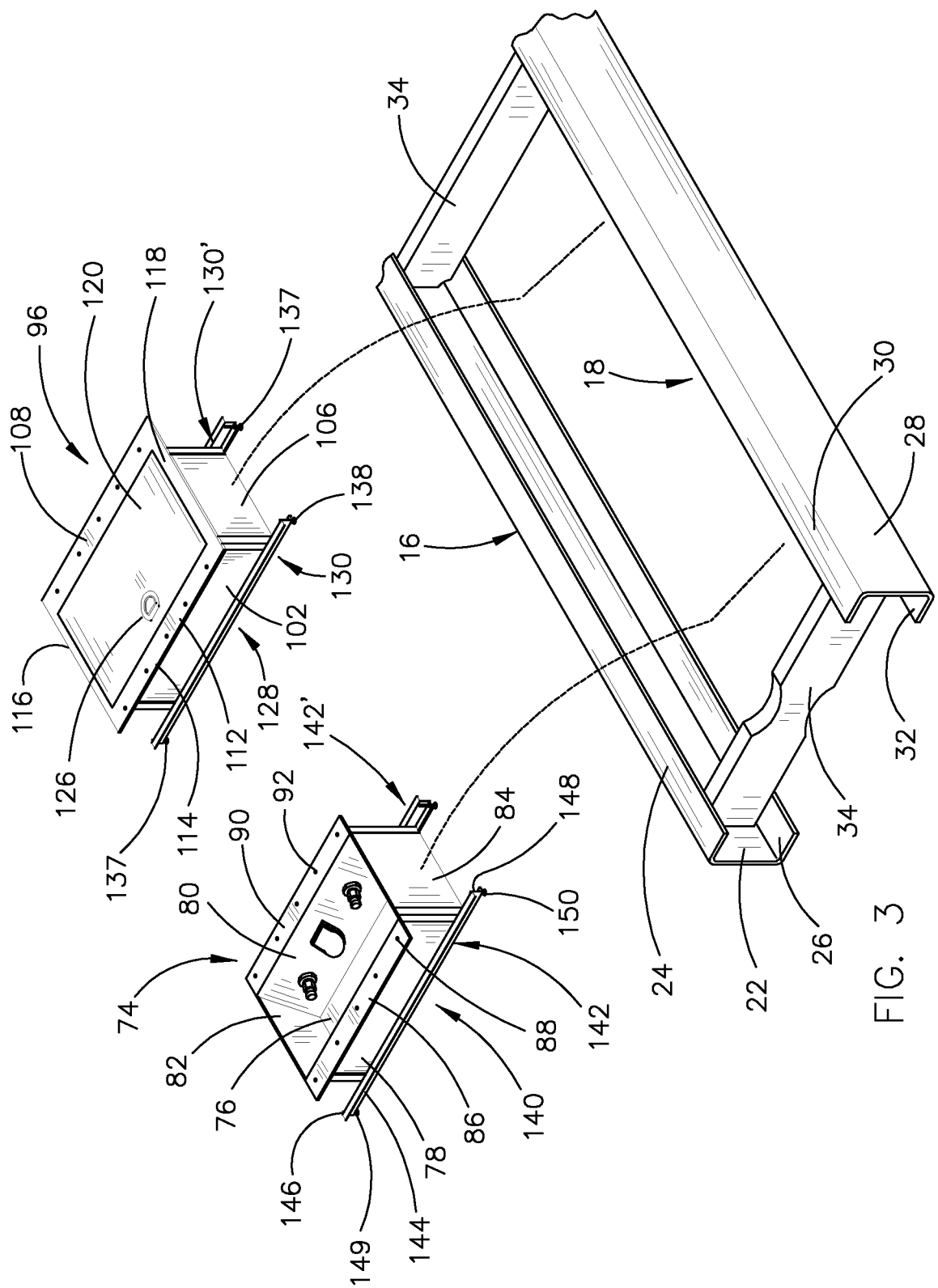
FIG. 3 is a partial exploded perspective view illustrating the storage box and airline box of this invention together with a truck chassis.
Figure 4:
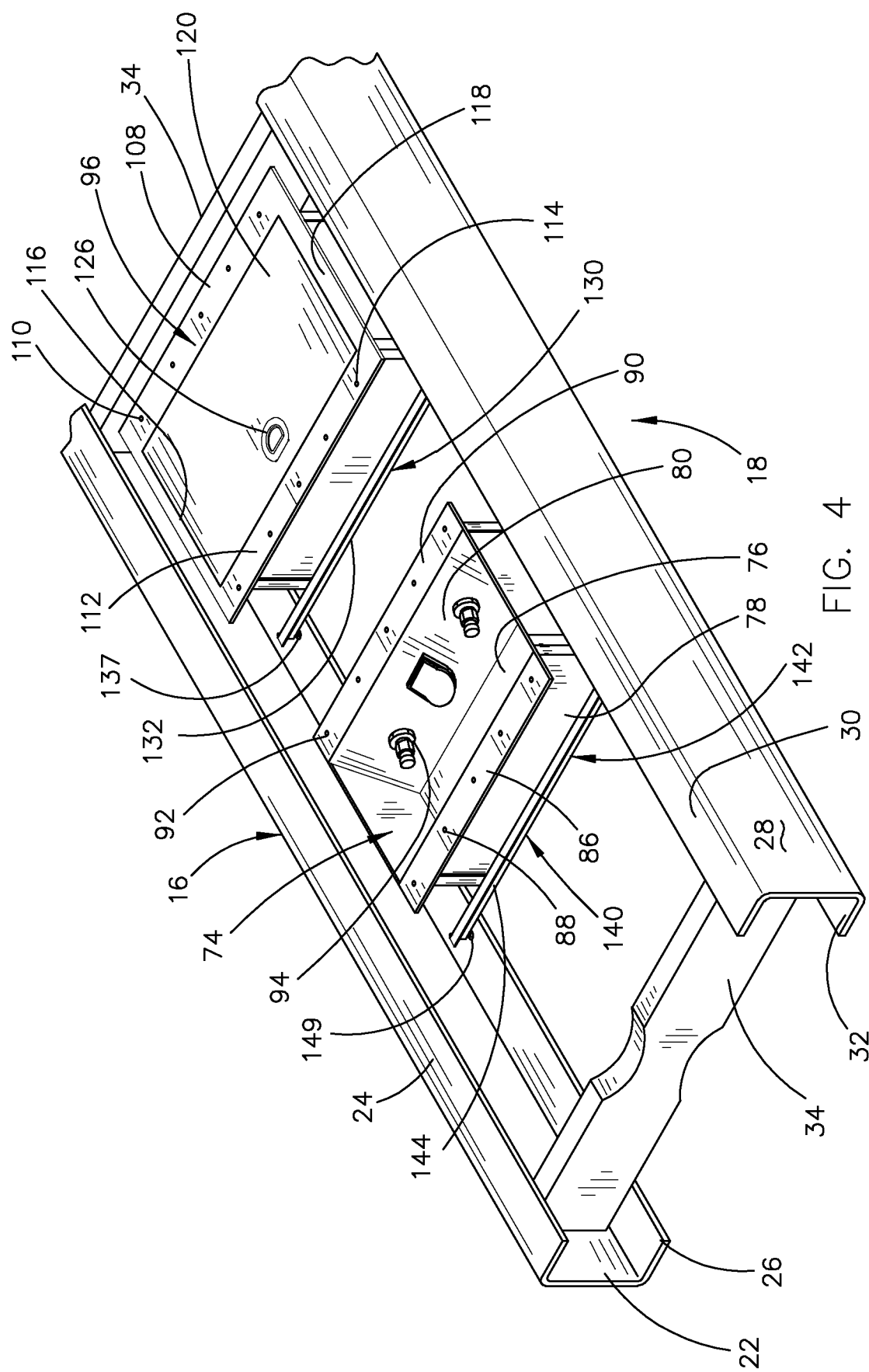
FIG. 4 is a partial perspective view illustrating the storage box and airline box positioned within the truck chassis prior to being secured thereto.

One method of assembling the deck plate assembly 37 from above the frame members (FIG. 3) will now be described. The rail brackets 38 and 56 will normally be mounted on the upper flanges 24 and 30 of frame members 16 and 18 and secured thereto. The storage box 96 is lowered at an angle to permit the storage box 96 to be inserted downwardly between the frame members 16 and 18 and then positioned horizontally so that the leveling feet 137' and 138 rest on the lower flange 32 of frame member 18 and so that the leveling feet 137 and 138' rest on the lower flange 26 of frame member 16. The leveling leg feet 137, 138, 137' and 138' will then be adjusted so that the flange 116 of storage box 96 is just below and inwardly of slide slot 54 of rail bracket 38 and so that the flange 118 of storage box 96 is just below and inwardly of slide slot 72 of rail bracket 58.

The support frame 164 is then positioned at the rear end of the rail brackets 38 and 56. The support frame 164 is then moved forwardly so that the frame member 168 of support frame 164 is positioned in the rear end of slide slot 54 and so that the frame member 172 of support frame 164 is positioned in the rear end of slide slot 72. The support frame 164 is then slidably moved forwardly in slide slots 54 and 72 until the support frame 164 is positioned directly above the storage box 96. The leveling feet 137, 138, 137' and 138' are then adjusted to raise the storage box 96 upwardly so that the flanges 108 and 112 of storage box 96 are brought into engagement with frame members 170 and 166 of support frame 164. Bolts are then extended downwardly through the bolt openings 176 and 174 in frame members 170 and 166 and into the bolt openings 110 and 114 in flanges 108 and 112 of storage box 96. Nuts are then secured to the bolts to secure storage box 96 to the support frame 164.

The metal sectional deck portion 178 is then inserted into the rear end of the rail brackets with the side edges 194 and 196 thereof being slidably received in the slide slots 54 and 72 of rail brackets 38 and 56 respectively. The deck portion 178 is slidably moved forwardly in the rail brackets 38 and 56 until the forward end thereof engages the rear end of frame member 166 of support frame 164.

If the airline box 74 has the leveling legs thereon, the airline box 74 is inserted downwardly between the frame members 16 and 18 in the same fashion as storage box 96 was positioned. When the leveling legs associated with airline box 74 are positioned on the lower flanges 26 and 32 of frame members 16 and 18, they are adjusted to raise the airline box 74 until the flanges 86 and 90 are just below and inwardly of the slide slots 54 and 72. The support frame 151 is then slidably moved forwardly in rail brackets 38 and 56 with the frame members 154 and 158 being received in slide slots 54 and 72. When support frame 151 has been properly positioned over the airline box 74, the frame members 152 and 156 are secured to the flanges 86 and 90 by bolts extending downwardly through the registering bolt openings in support frame 151 and the flanges 86 and 90 of airline box 74. The deck section 188 is then slidably mounted in the rail brackets 38 and 56.

If the airline box 74 does not have the leveling leg structure thereon, the airline box 74 must be manually raised upwardly into position with respect to the support frame 151 to enable the flanges of airline box 74 to be in engagement with the support frame 151. Bolts are then used to secure the box 74 to the support frame 151.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. In combination with a truck having longitudinally extending and horizontally disposed first and second frame members having a forward end, a rearward end, a lower end and an upper end with the first and second frame members having at least one cross-member extending therebetween at the rearward ends thereof, comprising:
   an elongated first rail bracket mounted on the upper end of the first frame member;
   said first rail bracket having a forward end, a rearward end, an inner side, an outer side, an upper side and a lower side;
   said inner side of said first rail bracket having an elongated and horizontally disposed first slide slot, having forward and rearward ends, formed therein which extends into said inner side thereof;
   an elongated second rail bracket mounted on the upper end of the second frame member;
   said second rail bracket having a forward end, a rearward end, an inner side, an outer side, an upper side and a lower side;
   said inner side of said second rail bracket having an elongated and horizontally disposed second slide slot, having forward and rearward ends, formed therein which extends into said inner side thereof;
   a horizontally disposed first box support frame including:
      (a) a first side frame member having a forward end, a rearward end, an upper side, a lower side, an inner side and an outer side;
      (b) a second side frame member having a forward end, a rearward end, an upper side, a lower side, an inner side and an outer side;
      (c) a forward end frame member having a first end, a second end, an upper side, a lower side, a forward side and a rearward side;
      (d) said first end of said forward end frame member being joined to said forward end of said first side frame member;
      (e) said second end of said forward end frame member being joined to said forward end of said second side frame member;
      (f) a rearward end frame member having a first end, a second end, an upper side, a lower side, a forward side and a rearward side;
      (g) said first end of said rearward end frame member being joined to said rearward end of said first side frame member; and
      (h) said second end of said rearward end frame member being joined to said rearward end of said second side frame member;
   said outer sides of said first and second side frame members of said first box support frame being slidably received in said rearward ends of said first and second slide slots in said first and second rail brackets respectively whereby said horizontally disposed first box support frame may be slidably moved forwardly to the desired location in said first and second slide slots without any interference from the at least one cross-frame member; and
   a first box secured to said first box support frame at said desired location.

2. The combination of claim 1 wherein said first box is an airline box.

3. The combination of claim 1 wherein said first box is a storage box.

4. The combination of claim 1 wherein said first box is secured to said first box support frame from beneath the first and second frame members and forwardly of the at least one cross-member.

5. The combination of claim 3 wherein a leveling leg structure is secured to said storage box which extends downwardly therefrom for engagement with the first and second frame members.

6. In combination with a truck having longitudinally extending and horizontally disposed first and second frame members having a forward end, a rearward end, a lower end and an upper end with the first and second frame members having at least one cross-member extending therebetween at the rearward ends thereof, comprising:
   an elongated first rail bracket mounted on said upper end of said first frame member;
   said first rail bracket having a forward end, a rearward end, an inner side, an outer side, an upper side and a lower side;
   said inner side of said first rail bracket having an elongated first slide slot, having forward and rearward ends, formed therein which extends thereinto;
   an elongated second rail bracket mounted on the upper end of the second frame member;
   said second rail bracket having a forward end, a rearward end, an inner side, an outer side, an upper side and a lower side;
   said inner side of said second rail bracket having an elongated second slide slot, having forward and rearward ends, formed therein which extends thereinto;
   a horizontally disposed first box support frame including:
      (a) a first side frame member having a forward end, a rearward end, an upper side, a lower side, an inner side and an outer side;
      (b) a second side frame member having a forward end, a rearward end, an upper side, a lower side, an inner side and an outer side;
      (c) a forward end frame member having a first end, a second end, an upper side, a lower side, a forward side and a rearward side;
      (d) said first end of said forward end frame member being joined to said forward end of said first side frame member;
      (e) said second end of said forward end frame member being joined to said forward end of said second side frame member;
      (f) a rearward end frame member having a first end, a second end, an upper side, a lower side, a forward side and a rearward side;
      (g) said first end of said rearward end frame member being joined to said rearward end of said first side frame member; and
      (h) said second end of said rearward end frame member being joined to said rearward end of said second side frame member;
   said outer sides of said first and second side frame members of said first box support frame being slidably received in said rearward ends of said first and second slide slots in said first and second rail brackets respectively whereby said horizontally disposed first box support frame may be slidably moved forwardly to the desired location in said first and second slide slots without any interference from the at least one cross-frame member; and a first box secured to said first box support frame at said desired location;

a horizontally disposed second box support frame including:
(a) a first side frame member having a forward end, a rearward end, an upper side, a lower side, an inner side and an outer side;
(b) a second side frame member having a forward end, a rearward end, an upper side, a lower side, an inner side and an outer side;
(c) a forward end frame member having a first end, a second end, an upper side, a lower side, a forward side and a rearward side;
(d) said first end of said forward end frame member being joined to said forward end of said first side frame member;
(e) said second end of said forward end frame member being joined to said forward end of said second side frame member;
(f) a rearward end frame member having a first end, a second end, an upper side, a lower side, a forward side and a rearward side;
(g) said first end of said rearward end frame member being joined to said rearward end of said first side frame member; and
(h) said second end of said rearward end frame member being joined to said rearward end of said second side frame member;

said outer sides of said first and second side frame members of said second box support frame being slidably received in said rearward ends of said first and second slide slots in said first and second rail brackets respectively whereby said horizontally disposed second box support frame may be slidably moved forwardly to the desired location in said first and second slide slots without any interference from said at least one cross-frame member;

a first box secured to said first box support frame at said desired location; and a second box secured to said second box support frame at said desired location.

7. The combination of claim 6 wherein said first box is an airline box and wherein said second box is a storage box.

8. The combination of claim 7 wherein said first and second boxes are secured to said first and second box support frames respectively from beneath the first and second frame members and forwardly of the at least one cross-member.

9. The combination of claim 5 wherein at least one metal sectional deck portion is also slidably mounted in said first and second slide slots.

10. The method of attaching a storage box to a truck frame including longitudinally extending first and second frame members having rearward and forward ends with each of the first and second frame members having an elongated rail bracket, mounted thereon with each of the said rail brackets having an elongated slide slot, with rearward and forward ends, formed therein, comprising the steps of:

positioning the storage box between the first and second frame members of the truck frame so that the upper end of the storage box is below the slide slots in said first and second rail brackets;

providing a horizontally disposed storage box frame which includes a first side frame member, a second side frame member, a forward frame member, a rearward frame member, with the first side frame member, second side frame member, said forward frame member and said rearward frame member defining a box receiving opening formed therebetween;

slidably inserting the first side frame member and said second side frame member into the rearward ends of the slide slots in said first and second rail brackets;

sliding the storage box frame forwardly in said slide slots to the desired location above said storage box without any interference with cross-members;

moving the storage box upwardly into engagement with the storage box frame; and securing the storage box to the storage box frame.

11. The method of attaching an airline box to a truck frame including longitudinally extending first and second frame members having rearward and forward ends with each of the first and second frame members having an elongated rail bracket, mounted thereon with each of the said rail brackets having elongated slide slots, with rearward and forward ends, formed therein, comprising the steps of:

positioning the airline box between the first and second frame members of the truck frame so that the upper end of the airline box is below the first and second slide slots;

providing a horizontally disposed airline box frame which includes a first side frame member, a second side frame member, a forward frame member, a rearward frame member, with the first side frame member, second side frame member, said forward frame member and said rearward frame member defining a box receiving opening formed therebetween;

slidably inserting the first side frame member and said second side frame member of said airline box frame into the rearward ends of the slide slots in the first and second rail brackets;

sliding the airline box frame forwardly in the slide slots to the desired location without any interference from cross-members;

moving the airline box upwardly into engagement with the airline box frame; and securing the airline box to the airline box frame.

12. The method of attaching a storage box to a truck frame including longitudinally extending first and second frame members having rearward and forward ends with each of the first and second frame members having an elongated rail bracket, mounted thereon with each of the said rail brackets having elongated slide slots, with rearward and forward ends, formed therein, comprising the steps of:

positioning the storage box between the first and second frame members of the truck frame so that the upper end of the storage box is below the first and second slide slots;

providing a horizontally disposed storage box frame which includes a first side frame member, a second side frame member, a forward frame member, a rearward frame member, with the first side frame member, second side frame member, said forward frame member and said rearward frame member defining a box receiving opening formed therebetween;

slidably inserting the first side frame member and said second side frame member of said storage box frame into the rearward ends of the slide slots in the first and second rail brackets;

sliding the storage box frame forwardly in the slide slots to the desired location without any interference from cross-members;

moving the storage box upwardly into engagement with the storage box frame; and securing the storage box to the storage box frame.

* * * * *